(12) United States Patent
Mazuelas et al.

(10) Patent No.: US 10,145,733 B2
(45) Date of Patent: Dec. 4, 2018

(54) AUTO-CALIBRATING LIGHT SENSOR DATA OF A MOBILE DEVICE

(71) Applicant: QUALCOMM Incorporated, San Diego, CA (US)

(72) Inventors: Santiago Mazuelas, San Diego, CA (US); Ashwin Swaminathan, San Diego, CA (US); Piero Zappi, San Diego, CA (US); Muralidhar Reddy Akula, San Diego, CA (US); Abhijeet Bisain, San Diego, CA (US); Aditya Narain Srivastava, Santa Clara, CA (US); Suhas Hariharapura Sheshadri, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 14/843,790

(22) Filed: Sep. 2, 2015

(65) Prior Publication Data

US 2017/0059401 A1    Mar. 2, 2017

(51) Int. Cl.
*G01J 1/44* (2006.01)
*G01J 1/42* (2006.01)
*G06F 9/4401* (2018.01)
*H04M 1/725* (2006.01)
*H04M 1/22* (2006.01)

(52) U.S. Cl.
CPC ............... *G01J 1/44* (2013.01); *G01J 1/4204* (2013.01); *G06F 9/4405* (2013.01); *H04M 1/72569* (2013.01); *G01J 2001/444* (2013.01); *H04M 1/22* (2013.01); *H04M 2250/12* (2013.01)

(58) Field of Classification Search
CPC ........................................................ G01J 1/44
See application file for complete search history.

(56) References Cited

U.S. PATENT DOCUMENTS 6,437,823 B1 * 8/2002 Zhang ................. H04N 17/002
348/187
7,072,806 B2   7/2006 Minor
(Continued)

FOREIGN PATENT DOCUMENTS

| EP | 2589927 A2 | 5/2013 |
|---|---|---|
| EP | 2696561 A2 | 2/2014 |
| JP | 2009010983 A | 1/2009 |

OTHER PUBLICATIONS

International Search Report and Written Opinion—PCT/US2016/045105—ISA/EPO—dated Nov. 21, 2016.

*Primary Examiner* — Casey Bryant
(74) *Attorney, Agent, or Firm* — Muncy, Geissler, Olds & Lowe, P.C./QUALCOMM

(57) ABSTRACT

A method of auto-calibrating light sensor data of a mobile device includes, obtaining, by the mobile device, one or more reference parameters representative of light sensor data collected by a reference device. The method also includes collecting, by the mobile device, light sensor data from a light sensor included in the mobile device, itself. One or more sample parameters of the light sensor data obtained from the light sensor included in the mobile device are then calculated. A calibration model is then determined for auto-calibrating the light sensor data of the light sensor included in the mobile device based on the one or more reference parameters and the one or more sample parameters.

21 Claims, 5 Drawing Sheets

(56) References Cited

U.S. PATENT DOCUMENTS

| | | | |
|---|---|---|---|
| 9,071,744 B1* | 6/2015 | Rahman | H04N 17/002 |
| 2011/0292219 A1* | 12/2011 | Chang | G06T 7/0018 |
| | | | 348/182 |
| 2012/0274799 A1* | 11/2012 | Wang | H04N 9/735 |
| | | | 348/222.1 |
| 2013/0147776 A1 | 6/2013 | Lazzaro et al. | |
| 2014/0046612 A1 | 2/2014 | Andelic et al. | |
| 2014/0132578 A1 | 5/2014 | Zheng | |
| 2014/0267782 A1 | 9/2014 | Liu | |

* cited by examiner

AUTO-CALIBRATING LIGHT SENSOR DATA OF A MOBILE DEVICE

FIELD OF DISCLOSURE

This disclosure relates generally to calibration of light sensors, and in particular, but not exclusively, relates to auto-calibrating light sensor data of a mobile device.

BACKGROUND

A wide range of electronic devices, including mobile wireless communication devices, personal digital assistants (PDAs), laptop computers, desktop computers, digital cameras, digital recording devices, and the like, include one or more embedded light sensors to enable applications to perform one or more light sensing operations. For example, an indoor/outdoor detection application may utilize light sensor data to detect whether the electronic device is indoors or outdoors. Similarly, the electronic device may include an electronic display (e.g., screen) where an automatic screen-brightness application adjusts the brightness of the screen based on the light sensor data. Further light-based applications may include sun intensity detection for a health-related application, or a white balancing application for adjusting the color of images captured by the electronic device.

Light sensors are typically low power (e.g., around 0.1 mA per hour) and may be implemented in a variety of ways depending on the make or model of the electronic device. In some devices, the light sensor is implemented as an ambient light sensor (ALS), which may be comprised of one, or in some cases, a few photodetectors. In other implementations the light sensor may be a Red Green Blue (RGB) sensor that detects intensities of red, green, and blue light. Similarly, a light sensor may be implemented as an ultraviolet detector that detects the intensity of ultraviolet light. The variations in the types, sensitivity, and even the circuitry that are included in the available light sensors included in various devices creates device-to-device variations in the resultant light sensor data.

Even still, various devices may physically locate the light sensor on the electronic device in a variety of positions. For example, a certain mobile device may embed a light sensor on a backside of the mobile device near a camera of the mobile device, while another mobile device may embed the light sensor on a front side of the mobile device, near the front-facing display.

These device dependent light sensors currently imply device dependent light-based applications. That is, each light-based application typically requires some knowledge of the device that it is running on as well as a known calibration factor for calibrating light sensor data that is acquired from the specific light sensor that is included on that device. In some applications this means storing, or otherwise obtaining a sizeable list of calibration factors for each possible device that may be running the light-based application. However, the large number of different devices in the market jeopardizes applications based on device dependent light-sensors data.

SUMMARY

Aspects of the present disclosure include a method, a mobile device, and computer-readable medium for auto-calibrating light sensor data of a mobile device.

For example, in one aspect, a method of auto-calibrating light sensor data of a mobile device includes, obtaining, by the mobile device, one or more reference parameters representative of light sensor data collected by a reference device. The method also includes obtaining, by the mobile device, light sensor data from a light sensor included in the mobile device, itself. One or more sample parameters of the light sensor data obtained from the light sensor included in the mobile device are then determined. A calibration model is then determined for auto-calibrating the light sensor data of the light sensor included in the mobile device based on the one or more reference parameters and the one or more sample parameters.

In another aspect, a mobile device for auto-calibrating light sensor data includes a light sensor, memory, and a processing unit. The light sensor is configured to generate the light sensor data, while the memory is adapted to store program code. The processing unit is coupled to the memory to access and execute instructions included in the program code to direct the mobile device to perform the auto-calibrating of the light sensor data. For example, the program code may include instructions to direct the mobile device to obtain one or more reference parameters representative of light sensor data collected by a reference device; obtain the light sensor data from the light sensor; determine one or more sample parameters of the light sensor data obtained from the light sensor; and determine a calibration model for auto-calibrating the light sensor data of the light sensor based on the one or more reference parameters and the one or more sample parameters.

In yet another aspect, a mobile device for auto-calibrating light sensor data includes a light sensor configured to generate the light sensor data and means for obtaining one or more reference parameters representative of light sensor data collected by a reference device. The mobile device also includes means for obtaining the light sensor data from the light sensor, means for determining one or more sample parameters of the light sensor data obtained from the light sensor, and means for determining a calibration model for auto-calibrating the light sensor data of the light sensor based on the one or more reference parameters and the one or more sample parameters.

In still another aspect, a non-transitory computer-readable medium includes program code stored thereon for auto-calibrating light sensor data, where the program code includes instructions to direct a mobile device to obtain one or more reference parameters representative of light sensor data collected by a reference device and to obtain the light sensor data from a light sensor included in the mobile device. The program code also includes instructions to direct the mobile device to determine one or more sample parameters of the light sensor data obtained from the light sensor included in the mobile device, and to determine a calibration model for auto-calibrating the light sensor data of the light sensor included in the mobile device based on the one or more reference parameters and the one or more sample parameters.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
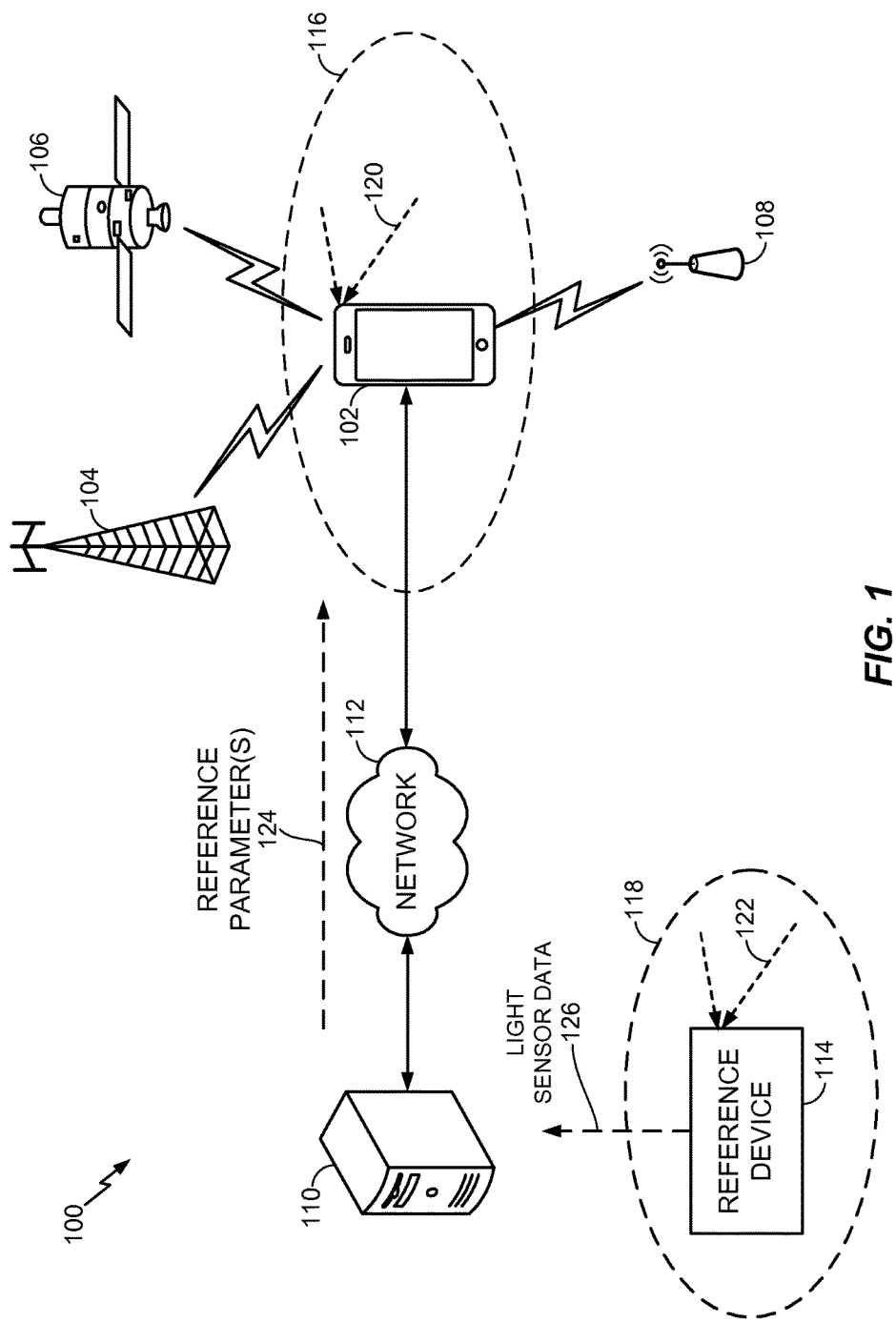
FIG. 1 is a wireless communications system for auto-calibrating light sensor data of a mobile device.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments discussed herein are based on a recognition that certain statistical values of light sensor data depend mainly on the device that generated the light sensor data and are approximately constant among different users. Accordingly, a method of auto-calibrating light sensor data is disclosed that includes determining a relationship among light sensor data for different devices in order to generate a calibration model. Embodiments discussed herein enable device agnostic light-based applications where Applications developed for one device can be seamlessly used in other devices.

By way of example, FIG. 1 illustrates a mobile device 102 operating in a wireless communications system 100, where the mobile device 102 includes a light sensor (not shown in current view) and is capable of auto-calibrating light sensor data that is generated by the light sensor.

As used herein, a "mobile device" refers to a device such as a cellular or other wireless communication device, personal communication system (PCS) device, personal navigation device (PND), Personal Information Manager (PIM), Personal Digital Assistant (PDA), laptop, wearable computer (e.g., a watch), or other suitable mobile device which is capable of receiving wireless communication signals. The term "mobile device" is also intended to include all devices, including wireless communication devices, computers, laptops, etc. which are capable of communication with a server, such as via the Internet, WiFi, or other network, and regardless of whether signal reception and/or light sensor auto-calibrating-related processing occurs at the mobile device, at a server, or at another device associated with the network. In addition, a "mobile device" may also include all electronic devices which are capable of performing a light sensing operation and which may include one or more light-based applications running locally on (or remotely through) the device. Any operable combination of the above are also considered a "mobile device."

As mentioned above, the mobile device 102 may include one or more light-based applications that perform one or more light sensing operations, such as indoor/outdoor detection, auto-screen brightness adjustment, sun intensity detection, and/or white balancing of one or more pictures.

Furthermore the mobile device 102 may communicate with one or more servers 110 to aid in the auto-calibrating of light sensor data via a network 112 (e.g., the internet) through one or more cellular towers 104, wireless communication access points 108, and/or satellite vehicles 106. The term "network" and "system" are often used interchangeably. Wireless communications system 100 may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. Wireless communications system 100 may be an IEEE 802.11x network, a Bluetooth network, an IEEE 802.15x, or some other type of network. The techniques may also be implemented in conjunction with any combination of WWAN, WLAN and/or WPAN.

As shown in FIG. 1, wireless communications system 100 includes mobile device 102 receiving light 120 (e.g., at a light sensor embedded in mobile device 102) while mobile device 102 is physically located in a first environment 116. In one embodiment, the first environment 116 refers to an environment associated with a user of mobile device 102. For example, the first environment 116 may include an indoors location, such as, a home, an office, a room, or may include an outdoors location, such as a yard, a park, or even an automobile.

As will be discussed in more detail below, mobile device 102 may be configured to perform an auto-calibrating process of light sensor data that is generated by a light sensor of mobile device 102 in response to the light 120. In one aspect, the auto-calibrating processes described herein may be performed by mobile device 102 to generate a calibration model that is stored at the mobile device 102. The calibration model may then be used during light sensing operations to adjust light sensor data that is collected during such light-sensing operations. Furthermore, the auto-calibration processes described herein may be run periodically to update or adjust the stored calibration model.

As shown in FIG. 1, mobile device 102 collects light sensor data while the mobile device 102 is located in the first environment 116. In one aspect, the light sensor data collected by mobile device 102 is collected over an extended period of time, such as an overnight period of time. Also, in one embodiment, the auto-calibrating process is autonomous. That is, the mobile device 102 may perform the auto-calibrating of light sensor data independent of any user interaction with mobile device 102. For example, mobile device 102 may be configured to perform the auto-calibrating of light sensor data as a background process or during a period of inactivity of a user of mobile device 102, without the need for a user to initiate the auto-calibrating process.

Based on the light sensor data collected from the light sensor of mobile device 102, the mobile device 102 may calculate one or more sample parameters of the light sensor data. In one embodiment, the sample parameters are statistical values, such as a mean or standard deviation of the light sensor data. In certain implementations the sample parameters and/or light sensor data, itself, may be expressed in terms of illuminance and may be represented as units of lux. The mobile device 102 may then determine a calibration model for auto-calibrating the light sensor data based on the sample parameters and also based on one or more reference parameters. The reference parameters are representative of light sensor data that is collected by another device that is separate and distinct from mobile device 102. In the illustrated example of FIG. 1, mobile device 102 exchanges one or more messages with server 110 in order to obtain the reference parameters 124 via network 112.

In one example, the reference parameters 124 are representative of light sensor data 126 that is collected by reference device 114. In one embodiment, reference device 114 is a light sensor device, such as an ambient light sensor (ALS), a red-green-blue (RGB) sensor, and/or an ultra-violet (UV) sensor, without being embedded into a system such as a mobile device. In another embodiment, reference device 114 is a mobile device including its own light sensor. In yet another embodiment, reference device 114 is a mobile device that is used as a reference for auto-calibrating a variety of types/models of mobile devices 102. The light sensor utilized by reference device 114 may be of a different type, sensitivity, comprised of differing circuitry, and/or embedded within a different physical location on reference device 114 when compared to the light sensor of the mobile device 102. Thus, the light sensor data 126 generated by reference device 114 may vary with respect to the light sensor data generated by mobile device 102, even if the reference device 114 and mobile device 102 were subject to identical lighting conditions.

In one embodiment, the light sensor data 126 collected by reference device 114 is collected over an extended period of time while reference device 114 is physically located in a second environment 118. Second environment 118 is separate and distinct from first environment 116 and thus, reference device 114 is subject to differing lighting conditions than are experienced by the mobile device 102. However, certain statistical values of light sensor data depend mainly on the device that generated the light sensor data and are approximately constant among different users or even differing lighting conditions. In one embodiment, second environment 118 is a controlled environment (e.g., a laboratory), such that while in the second environment 118, the reference device 114 is subjected to a variety of controlled and known lighting conditions.

In one embodiment, the server 110 is configured to provide one or more reference parameters 124 to the mobile device 102. The reference parameters 124 may include a mean and/or standard deviation of the light sensor data 126 that is collected by the reference device 114. Also, the time period during which the light sensor data 126 is collected by reference device 114 need not occur at the same time that mobile device 102 obtains its light sensor data, nor does it need to be of the same duration. In one implementation, reference device 114 generates light sensor data 126 prior to (e.g., well in advance of) the generation of light sensor data by mobile device 102.

While FIG. 1 shows one server 110, it should be understood that multiple servers may be used. Also, in one embodiment, mobile device 102 is configured to determine the calibration model by itself based on the received reference parameter(s) 124 and based on the sample parameter determined locally at mobile device 102. The sample parameter is determined locally at mobile device 102 based on light sensor data generated at mobile device 102. However, in another embodiment, the determination of the calibration model may be performed by the server 110 (or other server), where either the light sensor data generated by mobile device 102, or the determined sample parameter is provided to the server 110 by the mobile device 102.

Once the calibration model is determined, the mobile device 102 may be configured to apply the calibration model to further light sensor data obtained from the light sensor included in the mobile device 102 during one or more light sensing operations, such as indoor/outdoor detection, auto-screen brightness adjustment, sun intensity detection, and/or white balancing of one or more pictures, etc. The determining of a calibration model, in accordance with the embodiments discussed herein allow for device agnostic light-based applications where applications developed for one device can be seamlessly used in other devices without the need for maintaining a list/table of known calibration factors specific to each of a variety of devices.

Figure 2:
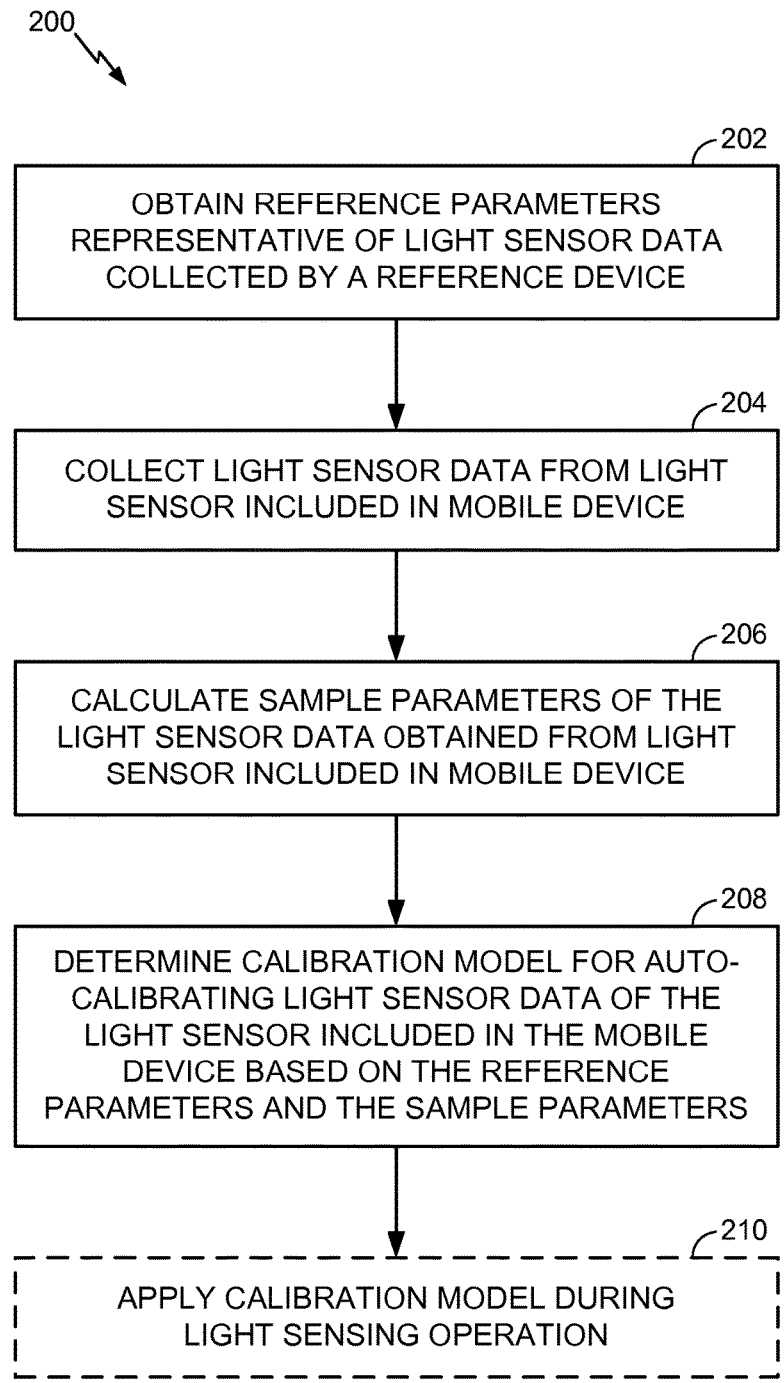
FIG. 2 is a flowchart illustrating a process of auto-calibrating light sensor data of a mobile device.

FIG. 2 is a flowchart illustrating a process 200 of auto-calibrating light sensor data of a mobile device. Process 200 is one possible implementation of an auto-calibrating process performed by mobile device 102 of FIG. 1. Process 200 will be described with reference to FIGS. 1-3.

As shown in FIG. 2, process block 202 includes the mobile device 102 obtaining one or more reference parameters 124 that are representative of light sensor data 126 that is collected by reference device 114. In one embodiment, mobile device 102 obtains the one or more reference parameters 124 by communicating with server 110 over network 112. In one aspect, the mobile device 102 may store the received reference parameters 124 for future use in future auto-calibrating of the light sensor data. In another aspect, the mobile device 102 may be configured to obtain the one or more reference parameters 124 from server 110, dynamically, during each instance of the auto-calibrating process 200. Reference parameters 124 may include one or more statistical values such as a mean and/or a standard deviation of the light sensor data 126.

In process block 204, the mobile device 102 is configured to collect light sensor data from a light sensor that is included in the mobile device 102. In one embodiment, the mobile device 102 is configured to collect a plurality of light sensor data values over an extend period of time. By way of example, the mobile device 102 may collect a plurality of light sensor data values overnight (e.g., beginning at 8 PM, 9 PM, 10 PM, or 11 PM and ending at 6 AM, 7 AM, 8 AM, or 9 AM, local time to mobile device 102). In another example, the mobile device 102 may collect a plurality of light sensor data values over a period of several days, weeks, etc.

Figure 3:
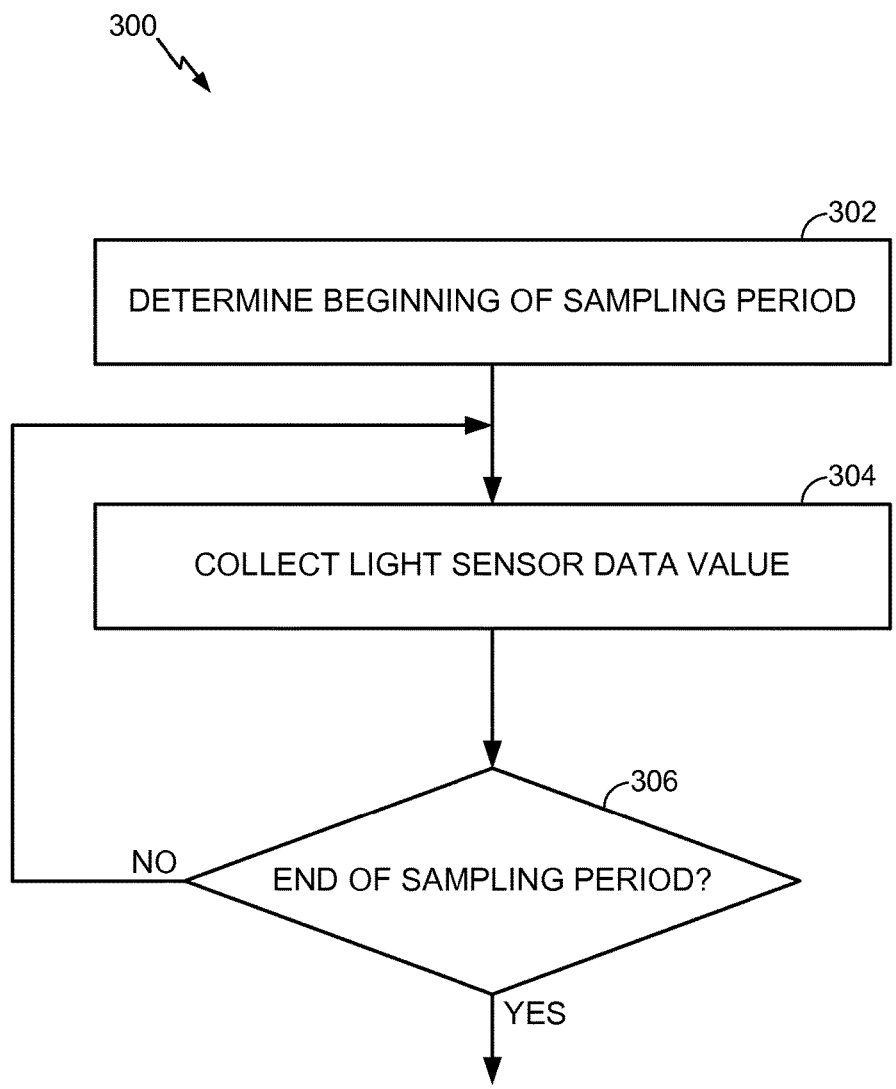
FIG. 3 is a flowchart illustrating a process of obtaining light sensor data from a light sensor included in a mobile device.

FIG. 3 is a flowchart illustrating a process 300 of collecting light sensor data values from a light sensor included in mobile device 102. Process 300 is one possible implementation of process block 204, of FIG. 2. In process block 302, the mobile device 102 determines whether the beginning of a sampling period should begin. In one example, the mobile device 102 may include one or more onboard sensors to determine whether to begin the sampling period. For example, mobile device 102 may include a clock, where the mobile device 102 monitors the time (e.g., 9 PM) in order to begin an overnight sampling of light sensor data values. In another example, the mobile device 102 includes a timer, where the mobile device 102 is configured to perform periodic sampling periods (e.g., every 12 hours). In still another example, the mobile device 102 may be configured to utilize one or more other sensors included in the mobile device 102 to determine a period of inactivity by the user, during which the sampling period may occur.

Next, in process block 304, the mobile device 102 collects one or more light sensor data values by sampling data generated by the light sensor included in the mobile device 102. In decision block 306, the mobile device 102 determines whether the sampling period has ended, again by utilizing, e.g., a clock, a timer, etc. If the sampling period has ended, the collection of light sensor data values has ended and process 300 ceases. If not, process 300 returns to process block 304 to collect further light sensor data values. In certain implementations, process 300 includes collecting light sensor data values at a sampling rate of 5 Hz. Of course, other sampling rates of the light sensor data values are possible in accordance with the teachings herein.

Returning now to FIG. 2, process block 206 includes calculating one or more sample parameters for the light sensor data obtained from the light sensor included in the mobile device 102 (i.e., the light sensor data collected in process block 204). The determined sample parameters may include one or more statistical values such as a mean and/or a standard deviation of the light sensor data generated by the light sensor of the mobile device 102.

Next, in process block 208, the mobile device 102 determines a calibration model for use in the auto-calibrating of the light sensor data generated by the light sensor of mobile device 102. In one aspect the determination of the calibration model is based on both the one or more reference parameters 124 and on the one or more sample parameters calculated in process block 206. In one example, determining the calibration model includes determining a calibration factor, where the calibration factor may be used to calibrate or otherwise adjust subsequently acquired light sensor data at mobile device 102. In one embodiment, the calibration factor can be determined from both the mean and standard deviations of the reference and sample parameters using a maximum likelihood estimator. By way of example, if $\log(\text{LIGHT SENSOR DATA}_{reference\ device\ 114}) \to N(\mu, \sigma^2)$, where $\mu$ is the mean of the light sensor data 126, and $\sigma^2$ is the standard deviation or variance of the light sensor data 126, then $\log(\text{LIGHT SENSOR DATA}_{mobile\ device\ 102})\Theta_i \to N(\mu, \sigma^2)$, where $\Theta_i$ is the calibration factor. Thus, $$\log(\text{LIGHT SENSOR }DATA_{mobile\ device\ 102}) \to N\left(\frac{\mu}{\Theta_i}, \frac{\sigma^2}{\Theta_i^2}\right).$$

Since, $\mu$ and $\sigma$ are known (i.e., included in reference parameters 124), then mobile device 102 may compute the maximum likelihood estimator of the calibration factor $\Theta_i$, as $$\Theta_i^{ML} = \frac{\mu m_i + \sqrt{m_i^2(\mu^2 + 4\sigma^2) + 4s_i^2\sigma^2}}{2(m_i^2 + s_i^2)},$$

where $m_i$ is the mean of the light sensor data obtained by a light sensor of mobile device 102, and where $s_i^2$ is a standard deviation, or variance, of the light sensor data obtained by the light sensor of mobile device 102.

Once the calibration model is determined, mobile device 102 may simply store the determined calibration model for future light-sensing operations, or may begin one of the light-sensing operations itself. For example, in optional process block 210, the mobile device 102 may be configured to apply the calibration model to further light sensor data obtained from the light sensor included in the mobile device 102 during one or more light sensing operations, such as indoor/outdoor detection, auto-screen brightness adjustment, sun intensity detection, and/or white balancing of one or more pictures, etc. In one implementation, processes 200 and 300 are performed once upon an initial use of the light sensor in the mobile device 102. In another implementation, processes 200 and 300 may be performed periodically (e.g., nightly) so as to improve and/or update the calibration model stored at mobile device 102.

Figure 4:
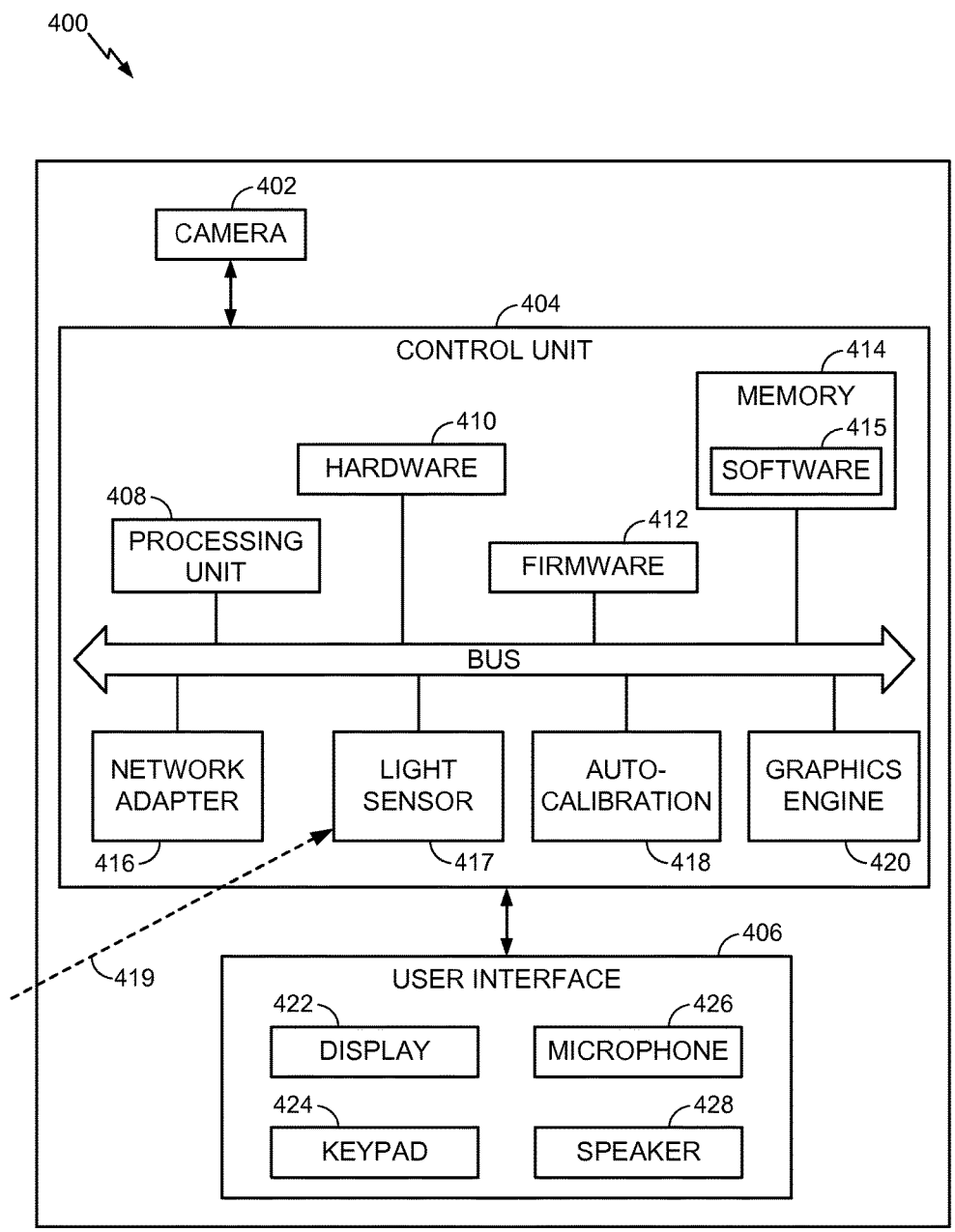
FIG. 4 is a functional block diagram illustrating an apparatus capable of performing the processes discussed herein.

FIG. 4 is a functional block diagram illustrating an apparatus 400 capable of performing the processes discussed herein. In one embodiment, apparatus 400 is a computer capable performing the auto-calibrating of light sensor data, such as process 200, described above. Apparatus 400 is one possible implementation of mobile device 102 of FIG. 1.

Apparatus 400 may optionally include a camera 402 as well as an optional user interface 406 that includes the display 422 capable of displaying images captured by the camera 402. User interface 406 may also include a keypad 424 or other input device through which the user can input information into the apparatus 400. If desired, the keypad 424 may be obviated by integrating a virtual keypad into the display 422 with a touch sensor. User interface 406 may also include a microphone 426 and speaker 428.

Apparatus 400 also includes a control unit 404 that is connected to and communicates with the camera 402 and user interface 406, if present. The control unit 404 accepts and processes images received from the camera 402 and/or from network adapter 416. Control unit 404 may be provided by a processing unit 408 and associated memory 414, hardware 410, firmware 412, software 415, and graphics engine 420.

Control unit 404 may further include a light sensor 417 and an auto-calibration unit 418. Light sensor 417 may be configured to generate one or more light sensor data values in response to light 419 received at apparatus 400 and incident upon light sensor 417. In one embodiment, light sensor 417 includes an ambient light sensor (ALS). In another embodiment, light sensor 417 includes a red-green-blue (RGB) sensor. In yet another embodiment, light sensor 417 includes an ultra-violet (UV) sensor.

Auto-calibration unit 418 may be configured to perform one or more auto-calibrating processes of the light sensor data generated by light sensor 417, such as described above with reference to process 200 of FIG. 2. Processing unit 408 and auto-calibration unit 418 are illustrated separately for clarity, but may be a single unit and/or implemented in the processing unit 408 based on instructions in the software 415 which is run in the processing unit 408. Processing unit 408, as well as the auto-calibration unit 418 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with apparatus 400, and is not to be limited to any particular type of memory or number of memories, or type of media upon which memory is stored.

The processes described herein may be implemented by various means depending upon the application. For example, these processes may be implemented in hardware 410, firmware 412, software 415, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 414 and executed by the processing unit 408. Memory may be implemented within or external to the processing unit 408.

If implemented in firmware 412 and/or software 415, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
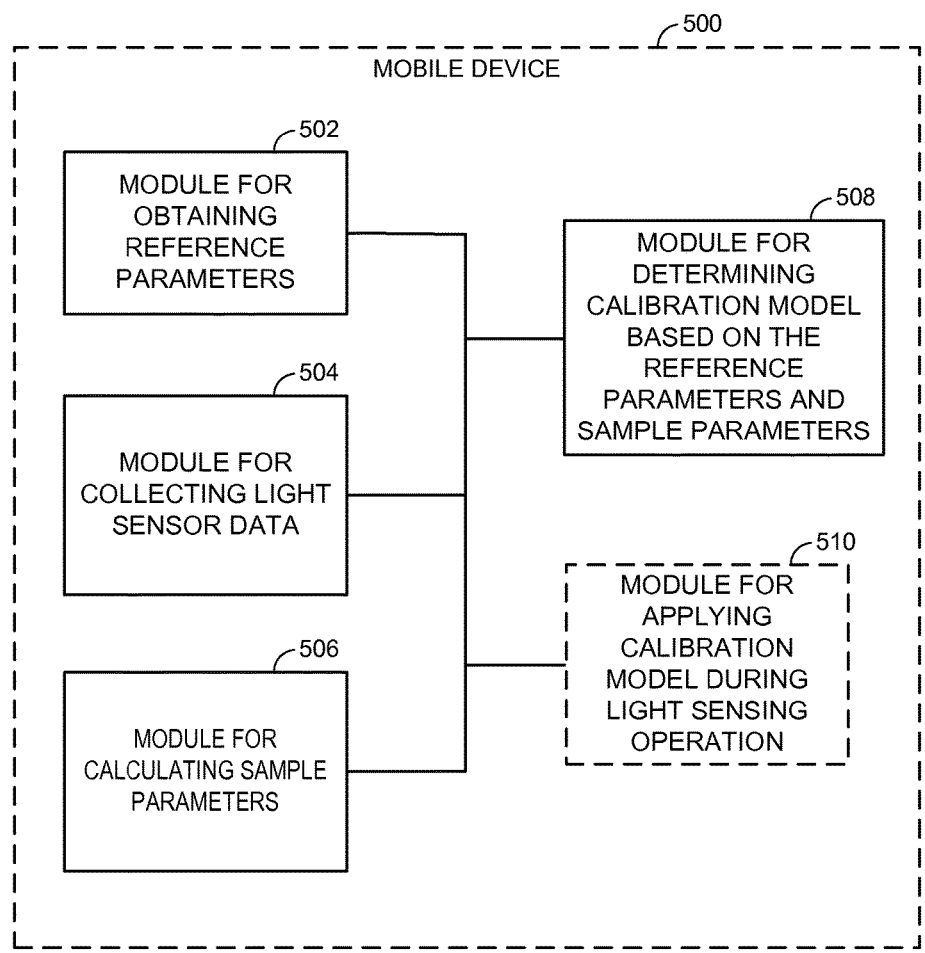
FIG. 5 is a simplified block diagram illustrating several sample aspects of components that may be employed in a mobile device configured to support the auto-calibrating of light sensor data as taught herein.

FIG. 5 is a simplified block diagram illustrating several sample aspects of components that may be employed in a mobile device 500 configured to support the auto-calibrating of light sensor data as taught herein. Mobile device 500 is one possible implementation of mobile device 102 of FIG. 1 represented as a series of interrelated functional modules.

A module 502 for obtaining one or more reference parameters representative of light sensor data collected by a reference device may correspond at least in some aspects to, for example, a network adapter 416 of FIG. 4. A module 504 for collecting light sensor data from a light sensor included in a mobile device may correspond at least in some aspects to, for example, an auto-calibration unit 418 and/or light sensor 417 of FIG. 4. A module 506 for calculating one or more sample parameters of the light sensor data obtained from the light sensor included in the mobile device 500 may correspond at in some aspects to, for example, auto-calibration unit 418 and/or processing unit 408, of FIG. 4. A module 508 for determining a calibration model based on the reference parameters and sample parameters may correspond at in some aspects to, for example, auto-calibration unit 418 and/or processing unit 408, of FIG. 4. A module 510 for applying the calibration model to light sensor data during one or more light sensing operations may correspond at in some aspects to, for example, auto-calibration unit 418 and/or processing unit 408, of FIG. 4.

The functionality of the modules 502-510 of FIG. 5 may be implemented in various ways consistent with the teachings herein. In some designs, the functionality of these modules 502-510 may be implemented as one or more electrical components. In some designs, the functionality of these modules 502-510 may be implemented as a processing system including one or more processor components. In some designs, the functionality of these modules 502-510 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 5, as well as other components and functions described herein, may be implemented using any suitable means. Such means also may be implemented, at least in part, using corresponding structure as taught herein. For example, the components described above in conjunction with the "module for" components of FIG. 5 also may correspond to similarly designated "means for" functionality. Thus, in some aspects, one or more of such means may be implemented using one or more of processor components, integrated circuits, or other suitable structure as taught herein.

While the foregoing disclosure shows illustrative embodiments of the invention, it should be noted that various changes and modifications could be made herein without $$\Theta_i^{ML} = \frac{\mu m_i + \sqrt{m_i^2(\mu^2 + 4\sigma^2) + 4s_i^2\sigma^2}}{2(m_i^2 + s_i^2)}.$$

What is claimed is:

1. A method of auto-calibrating light sensor data of a mobile device, the method comprising:
    sending, by the mobile device, one or more messages to one or more servers in order to obtain one or more reference parameters representative of light sensor data collected by a light sensor of a reference device other than the mobile device;
    obtaining, by the mobile device, one or more reference parameters, from one or more servers over a network dynamically during an instance of an auto-calibrating process, representative of light sensor data collected by a light sensor of a reference device other than the mobile device;
    collecting, by the mobile device, light sensor data from a light sensor included in the mobile device, wherein the light sensor included in the mobile device comprises at least one of an ambient light sensor, or a red-green-blue sensor, or an ultra-violet sensor;
    calculating one or more sample parameters of the light sensor data obtained from the light sensor included in the mobile device;
    determining a calibration model for auto-calibrating the light sensor data of the light sensor included in the mobile device based on the one or more reference parameters and the one or more sample parameters, wherein determining the calibration model includes calculating a calibration factor based on the one or more reference parameters and the one or more sample parameters; and
    performing a light sensing operation, by the mobile device, that includes collecting subsequent light sensor data from the light sensor included in the mobile device and adjusting the subsequent light sensor data based on the calibration factor of the calibration model.

2. The method of claim 1, wherein the one or more reference parameters and the one or more sample parameters include one or more statistical values selected from the group consisting of: a mean and a standard deviation of respective light sensor data.

3. The method of claim 1, wherein obtaining the one or more reference parameters includes obtaining the one or more reference parameters from a server.

4. The method of claim 1, wherein collecting the light sensor data from the light sensor included in the mobile device includes collecting a plurality of light sensor data values over an overnight period of time.

5. The method of claim 1, wherein
    calculating the one or more sample parameters comprises calculating a mean $m_i$ and a standard deviation $s_i^2$ of the light sensor data collected from the light sensor included in the mobile device,
    obtaining the one or more reference parameters comprises obtaining a mean $\mu$ and a standard deviation $\sigma^2$ of the light sensor data collect by the reference device, and
    calculating the calibration factor comprises calculating a maximum likelihood estimator $\Theta_i^{ML}$ of the calibration factor according to:

6. The method of claim 1, wherein the light sensing operation includes one or more light sensing operations selected from the group consisting of: indoor/outdoor detection, auto-screen brightness adjustment, sun intensity detection, and white balancing of one or more pictures.

7. The method of claim 1, further comprising performing the auto-calibrating of the light sensor data independent of any user interaction with the mobile device.

8. The method of claim 1, wherein obtaining the light sensor data from the light sensor included in the mobile device includes obtaining the light sensor data from the light sensor while the mobile device is located in a first environment, and wherein the light sensor data collected by the reference device is collected while the reference device is located is a second environment that is separate and distinct from the first environment.

9. The method of claim 1, wherein the calibration factor is calculated based on the one or more reference parameters and the one or more sample parameters using a maximum likelihood estimator.

10. A mobile device for auto-calibrating light sensor data, the mobile device comprising:
    a light sensor configured to generate the light sensor data, wherein the light sensor comprises at least one of an ambient light sensor, or a red-green-blue sensor, or an ultra-violet sensor;
    memory configured to store program code; and
    a processing unit coupled to the memory configured to access and execute instructions included in the program code to direct the mobile device to:
    send, from the mobile device, one or more messages to one or more servers in order to obtain one or more reference parameters representative of light sensor data collected by a light sensor of a reference device other than the mobile device;
    obtain one or more reference parameters, from one or more servers over a network dynamically during an instance of an auto-calibrating process, representative of light sensor data collected by a light sensor of a reference device other than the mobile device;
    collect the light sensor data from the light sensor;
    calculate one or more sample parameters of the light sensor data obtained from the light sensor;
    determine a calibration model for auto-calibrating the light sensor data of the light sensor based on the one or more reference parameters and the one or more sample parameters, wherein the instructions to determine the calibration model includes instructions to calculate a calibration factor based on the one or more reference parameters and the one or more sample parameters; and
    perform a light sensing operation, by the mobile device, that includes collection of subsequent light sensor data from the light sensor included in the mobile device and adjustment of the subsequent light sensor data based on the calibration factor of the calibration model.

11. The mobile device of claim 10, wherein the one or more reference parameters and the one or more sample parameters include one or more statistical values selected from the group consisting of: a mean and a standard deviation of respective light sensor data.

12. The mobile device of claim 10, wherein the instructions to collect the light sensor data from the light sensor includes instructions to collect a plurality of light sensor data values over an overnight period of time.

13. The mobile device of claim 10, wherein
the instructions to calculate the one or more sample parameters comprises instructions to calculate a mean $m_i$ and a standard deviation $s_i^2$ of the light sensor data collected from the light sensor included in the mobile device,
the instructions to obtain the one or more reference parameters comprises instructions to obtain a mean $\mu$ and a standard deviation $\sigma^2$ of the light sensor data collect by the reference device, and
the instructions to calculate the calibration factor comprises instructions to calculate a maximum likelihood estimator $\Theta_i^{ML}$ of the calibration factor according to:

$$\Theta_i^{ML} = \frac{\mu m_i + \sqrt{m_i^2(\mu^2 + 4\sigma^2) + 4s_i^2\sigma^2}}{2(m_i^2 + s_i^2)}.$$

14. The mobile device of claim 10, wherein the light sensing operation includes one or more light sensing operations selected from the group consisting of: indoor/outdoor detection, auto-screen brightness adjustment, sun intensity detection, and white balancing of one or more pictures.

15. The mobile device of claim 10, wherein the program code further comprises instructions to perform the auto-calibrating of the light sensor data independent of any user interaction with the mobile device.

16. The mobile device of claim 10, wherein the instructions to obtain the light sensor data from the light sensor includes instructions to obtain the light sensor data from the light sensor while the mobile device is located in a first environment, and wherein the light sensor data collected by the reference device is collected while the reference device is located is a second environment that is separate and distinct from the first environment.

17. A mobile device for auto-calibrating light sensor data, the mobile device comprising:
a light sensor configured to generate the light sensor data, wherein the light sensor comprises at least one of an ambient light sensor, or a red-green-blue sensor, or an ultra-violet sensor;
means for sensing, by the mobile device, one or more messages to one or more servers in order to obtain one or more reference parameters representative of light sensor data collected by a light sensor of a reference device other than the mobile device;
means for obtaining one or more reference parameters, from one or more servers over a network dynamically during an instance of an auto-calibrating process, representative of light sensor data collected by a light sensor of a reference device other than the mobile device;
means for collecting the light sensor data from the light sensor;
means for calculating one or more sample parameters of the light sensor data obtained from the light sensor;
means for determining a calibration model for auto-calibrating the light sensor data of the light sensor based on the one or more reference parameters and the one or more sample parameters, wherein the means for determining the calibration model includes means for calculating a calibration factor based on the one or more reference parameters and the one or more sample parameters; and
means for performing a light sensing operation, by the mobile device, that includes collection of subsequent light sensor data from the light sensor included in the mobile device and adjustment of the subsequent light sensor data based on the calibration factor of the calibration model.

18. The mobile device of claim 17, wherein the one or more reference parameters and the one or more sample parameters include one or more statistical values selected from the group consisting of: a mean and a standard deviation of respective light sensor data.

19. The mobile device of claim 17, further comprising means for performing the auto-calibrating of the light sensor data independent of any user interaction with the mobile device.

20. A non-transitory computer-readable medium including program code stored thereon for auto-calibrating light sensor data, the program code comprising instructions to direct a mobile device to:
send one or more messages to one or more servers in order to obtain one or more reference parameters representative of light sensor data collected by a light sensor of a reference device other than the mobile device;
obtain one or more reference parameters, from one or more servers over a network dynamically during an instance of an auto-calibrating process, representative of light sensor data collected by a light sensor of a reference device other than the mobile device;
collect light sensor data from a light sensor included in the mobile device, wherein the light sensor included in the mobile device comprises at least one of an ambient light sensor, or a red-green-blue sensor, or an ultra-violet sensor;
calculate one or more sample parameters of the light sensor data obtained from the light sensor included in the mobile device;
determine a calibration model for auto-calibrating the light sensor data of the light sensor included in the mobile device based on the one or more reference parameters and the one or more sample parameters, wherein the instructions to determine the calibration model includes instructions to calculate a calibration factor based on the one or more reference parameters and the one or more sample parameters; and
perform a light sensing operation, by the mobile device, that includes collection of subsequent light sensor data from the light sensor included in the mobile device and adjustment of the subsequent light sensor data based on the calibration factor of the calibration model.

21. The non-transitory computer-readable medium of claim 20, wherein the one or more reference parameters and the one or more sample parameters include one or more statistical values selected from the group consisting of: a mean and a standard deviation of respective light sensor data.

* * * * *